United States Patent [19]
Castellucci et al.

[11] Patent Number: 5,518,565
[45] Date of Patent: May 21, 1996

[54] METHOD OF REPAIRING A HOLE IN A SHEET MEMBER

[75] Inventors: Nicholas T. Castellucci, San Pedro; David G. Tureaud, Los Angeles; Owen V. Manning, Lake Forest, all of Calif.

[73] Assignee: Northrop Grumman Corporation, Los Angeles, Calif.

[21] Appl. No.: 306,044

[22] Filed: Sep. 14, 1994

[51] Int. Cl.$^6$ ..................................................... B32B 35/00
[52] U.S. Cl. ........................... 156/94; 29/402.09; 156/98; 264/36; 428/63
[58] Field of Search .................... 156/94, 98; 264/36; 52/514; 29/402.09, 402.11, 402.18; 428/63; 425/11, 12

[56] References Cited

U.S. PATENT DOCUMENTS

| | | |
|---|---|---|
| 2,728,120 | 12/1955 | Snyder . |
| 2,997,416 | 8/1961 | Helton . |
| 3,325,955 | 6/1967 | Haut .......................................... 52/514 |
| 3,734,795 | 5/1973 | Griffith . |
| 4,390,333 | 6/1983 | Dubois ...................................... 425/11 |
| 4,465,648 | 8/1984 | Kiriyama et al. . |
| 4,510,728 | 4/1985 | Key ............................................ 52/514 |
| 4,519,856 | 5/1985 | Lazzara . |
| 4,715,151 | 12/1987 | Garblik ..................................... 52/514 |
| 4,758,295 | 7/1988 | Sawaide et al. . |
| 4,758,854 | 4/1986 | Demeglio ............................. 29/402.18 |
| 4,809,478 | 3/1989 | Bernard ..................................... 52/514 |
| 5,034,254 | 7/1991 | Cologna et al. . |
| 5,093,055 | 3/1992 | Skiff ...................................... 264/46.6 |
| 5,134,774 | 8/1992 | Porter . |
| 5,190,611 | 3/1993 | Cologna et al. . |
| 5,257,486 | 11/1993 | Holmwall . |

*Primary Examiner*—Daniel J. Stemmer
*Attorney, Agent, or Firm*—Terry J. Anderson; Karl J. Hoch, Jr.

[57] ABSTRACT

A system is provided for repairing a planar sheet member which has a damaged region defined by a boundary. A generally planar repair assembly having an outer periphery initially spaced from the boundary of the damaged region is inserted into the damaged region so as to be coplanar with the sheet member. Thereupon, the repair assembly is enlarged until its outer periphery is generally adjacent to the boundary of the damaged region to be repaired. At the same time, a frangible wall in a container of the repair assembly positioned between a first compartment of liquid filler material and a second compartment of liquid hardener chemically reactive with the filler material is broken such that the filler material and hardener intermix and react to form a resultant liquid repair material. The liquid repair material is then discharged from the container to fill voids between the outer periphery of the repair assembly and the boundary of the damaged region and to fixedly mount the repair assembly to the planar sheet member so as to plug the damaged region. When the liquid repair material hardens, the repair assembly becomes integrated with the sheet member. A first tubular handle serves to transport the repair assembly to the repair site and a second elongated handle associated with the first tubular handle serves to operate a mechanism within the repair assembly to enlarge its periphery, cause intermixing of the chemicals, and subsequently, their discharge. At the conclusion of the operation, the first and second handles are removed from the repair assembly for reuse.

1 Claim, 3 Drawing Sheets

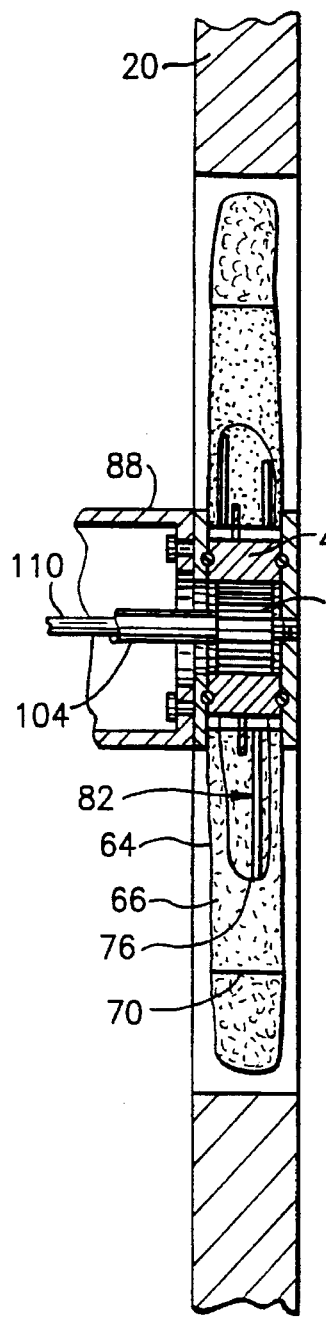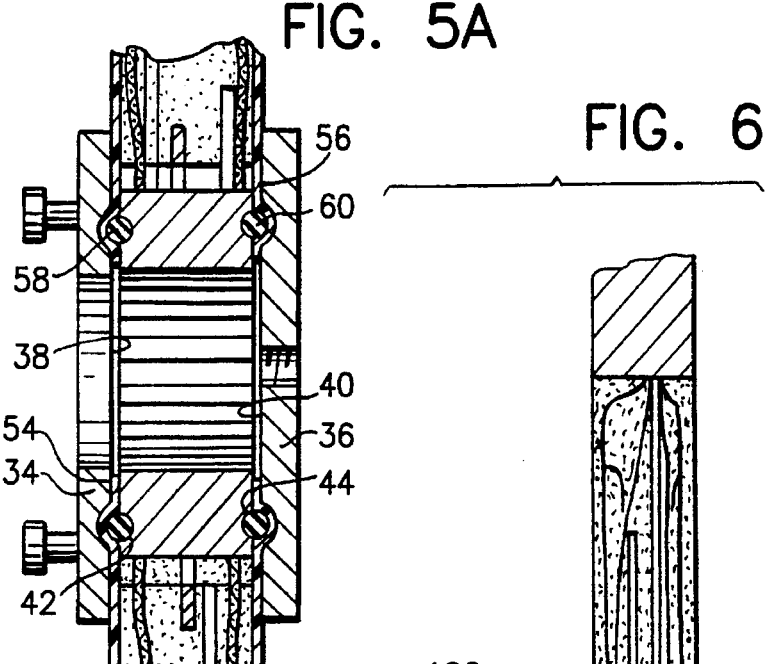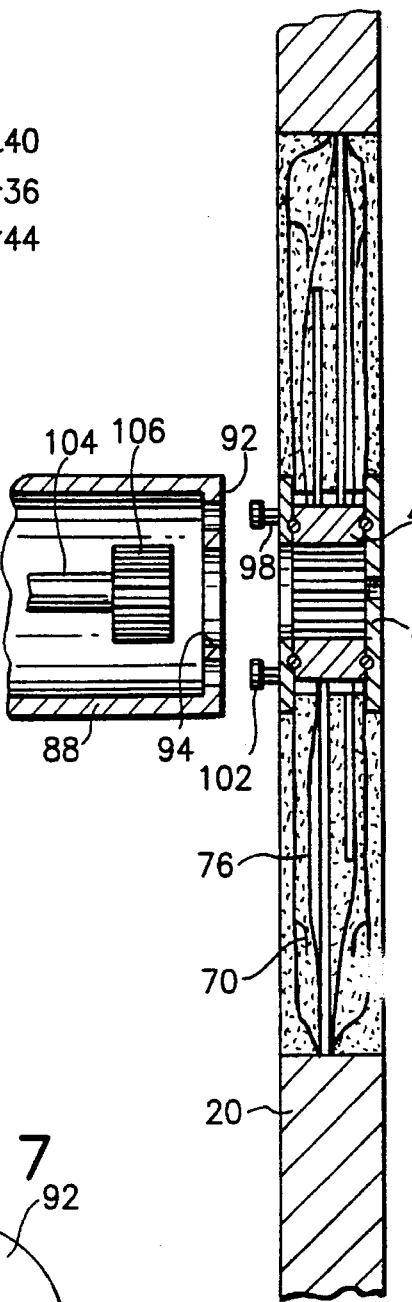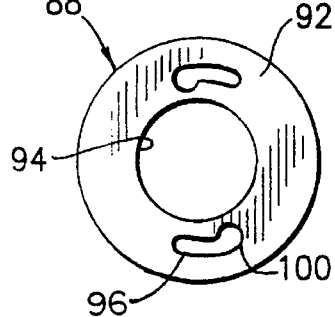

METHOD OF REPAIRING A HOLE IN A SHEET MEMBER

BACKGROUND OF THE INVENTION

1. Field of the Invention

The present invention relates to a system for repairing a hole of significant size in a generally planar sheet member, particularly in an instance in which the sheet member may be comprised of wood, metal, ceramic, or of a composite material.

2. Description of the Prior Art

It is known to fabricate structural panels from a composite material comprising layers of reinforcing fibers (e.g. graphite fibers) within a resin matrix. The use of such composite materials for making structural and nonstructural components is well-known and widely recognized for its benefit of providing high strength with low weight since a construction is applicable to vehicles of all varieties, such as ground and water vehicles, aircraft and even space vehicles, and also include fixed structures such as buildings and storage tanks. When damage occurs to a structural panel of this material, the damage must be repaired to restore the structural strength of the panel, restore its smoothness and appearance, and in the case of aerodynamic surfaces, reconfigure the surface to its original curvature or configuration, as close as possible to the original mold line.

The problem is particularly troublesome with modern composite materials because of the higher load requirements for these materials and because of the necessity for producing flush repairs without the use of fasteners. Fasteners had previously been permitted for applying patches but undesirable for repairing modern composite structures. To accommodate the fasteners, additional holes must be drilled in the material, which creates additional weakness in the panel. Moreover, it is difficult to produce a patch that is flush with the original mold line of the panel and conforms exactly with its curvature when using a patch secured with fasteners. Finally, such fasteners exert a constant compression force on the repaired composite panel or honeycomb panel to hold the patch in place which could distort the cross section of the panel in the patch location and thereby reduce its load carrying capacity.

The installation of prior art patches, in the vicinity of underlying spars and ribs within the member, sometimes on the blind-side of the panel, required specially designed patches or connecting structure to the struts or ribs which could interfere with underlying mechanism. On panels which form an aerodynamic surface, especially on high performance aircraft, the non-conformance to the original contour and loss of smoothness could produce a flutter of the control surface which could adversely affect aircraft performance and cause premature fatigue delaminating of the panel structure.

Sometimes, prior art patches for composite materials required a series of steps, each requiring a separate cure time for the bonding agent in each of the steps. This prolonged the repair process and increased the number of steps involved in making the repair, thereby increasing the cost and increasing the down time of the equipment being repaired. In addition, it is an exacting process requiring special skills and care to produce an acceptable patch. Moreover, the prior art patches have required complicated, expensive, and cumbersome equipment requiring special training of operators and subject to failure in operation which would often interrupt the capability of the facility to make those repairs.

Some other unsolved problems with prior art patches have included the inability to effect a permanent hermetic seal against leakage of pressurized fuel, air, water and other fluids and gases through the patch. Also, prior art patches were often thermally or chemically incompatible with the parent structure so that differential rates of thermal expansion caused loss of hermetic integrity of the patch or cause the panel to become distorted. Chemical incompatibility could cause loss of chemical resistance to certain chemicals such as hydraulic fluid which could cause the patch to swell and weaken. In addition, dissimilar metals and carbon/metal combinations can cause a harmful galvanic reaction that would weaken the patch.

SUMMARY OF THE INVENTION

It was in light of the prior art as just described, that the present invention was conceived and has now been reduced to practice.

The present invention provides a method of restoring bearing load capability to a fiber reinforced/resin matrix composite material panel which has an undesired opening in it as used herein, the term "undesired opening" includes any undesired opening, hole, or other interruption in a surface of the panel. The opening, hole, or other interruption may be a result of damage to the panel, misdrilling, mis-sizing, or wearing of a fastener hole, or some other cause. The term includes openings, holes, and other interruptions that extend only part of the way through the panel, as well as those which extend all the way through the panel.

According to the system of the invention, it may be desirable to remove material from the panel in a region surrounding the undesired opening to form a prepared opening having a predetermined size and shape. In this event, the prepared opening is sized to encompass the undesired opening and is shaped to present an interior bearing load transmitting surface. This surface is substantially perpendicular to an outer surface of the panel.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 5 is a cross section view taken generally along 5—5 in FIG. 2;

FIG. 5A is a detail cross section view of an enlarged portion of FIG. 5;

FIG. 6 is a detail cross section view taken generally along line 6—6 in FIG. 3; and FIG. 7 is a detail end view of a component of the invention.

DETAILED DESCRIPTION OF THE PREFERRED EMBODIMENT

Figure 1:
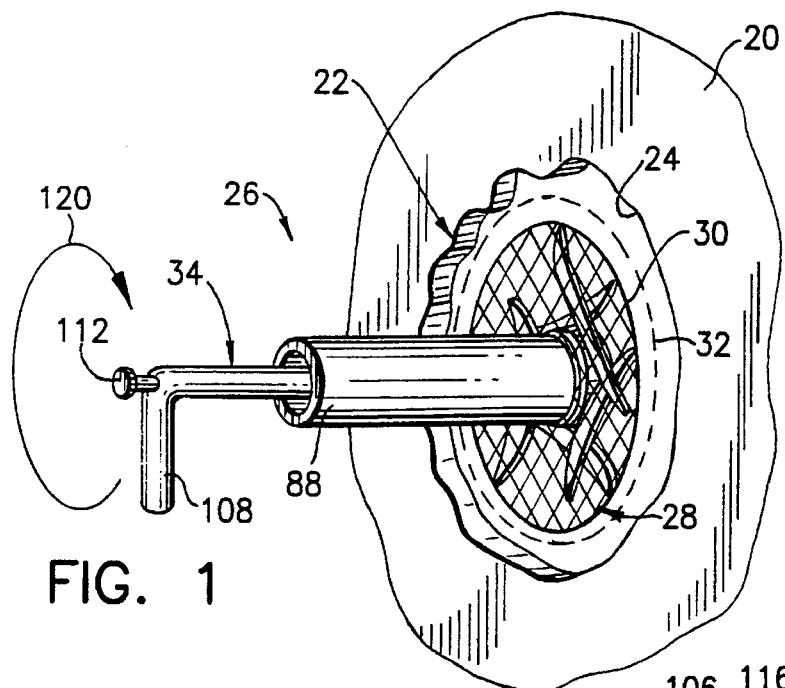
FIG. 1 is a perspective view illustrating the use of apparatus embodying the present invention for repairing a damaged region of a planar sheet member.

Turn now to the drawings and, initially, to FIG. 1 which illustrates a generally planar sheet member 20 having a damaged region 22 defined by a boundary 24. The boundary 24, as illustrated, may actually be an improvement on an original boundary which defined the damaged region 22 immediately after an occurrence which created the condition.

In any event, FIG. 1 depicts apparatus 26 embodying the present invention for repairing the sheet member 20. To this end, the apparatus 26 includes a repair assembly 28 for insertion into the damaged region 22 so as to be coplanar with the sheet member 20. The repair assembly 28 is smaller than the damaged region 22 and has an outer periphery 30 which is spaced from the boundary 24 and movable from a first locus as indicated by solid lines spaced from the boundary 24 to a second locus as indicated by a dashed line 32 which lies adjacent the boundary 24. As will be described subsequently in greater detail, the repair assembly 28 contains liquid repair material which is capable of being hardened upon release to the atmosphere.

The apparatus 26 also includes an actuating mechanism generally depicted at 33 for moving the outer periphery 30 of the repair assembly 28 between the first locus (FIGS. 1 and 2) and the second locus (FIGS. 1 and 3) and for causing discharge from the repair assembly of the liquid repair material to fill the void within the damaged region 22. By so doing, the apparatus 26 is effective to fixedly mount the repair assembly 28 to the sheet member 20 so as to plug the damaged region and cause the repair assembly to become integrated with the sheet member when the resultant repair material fully hardens.

Figure 4:
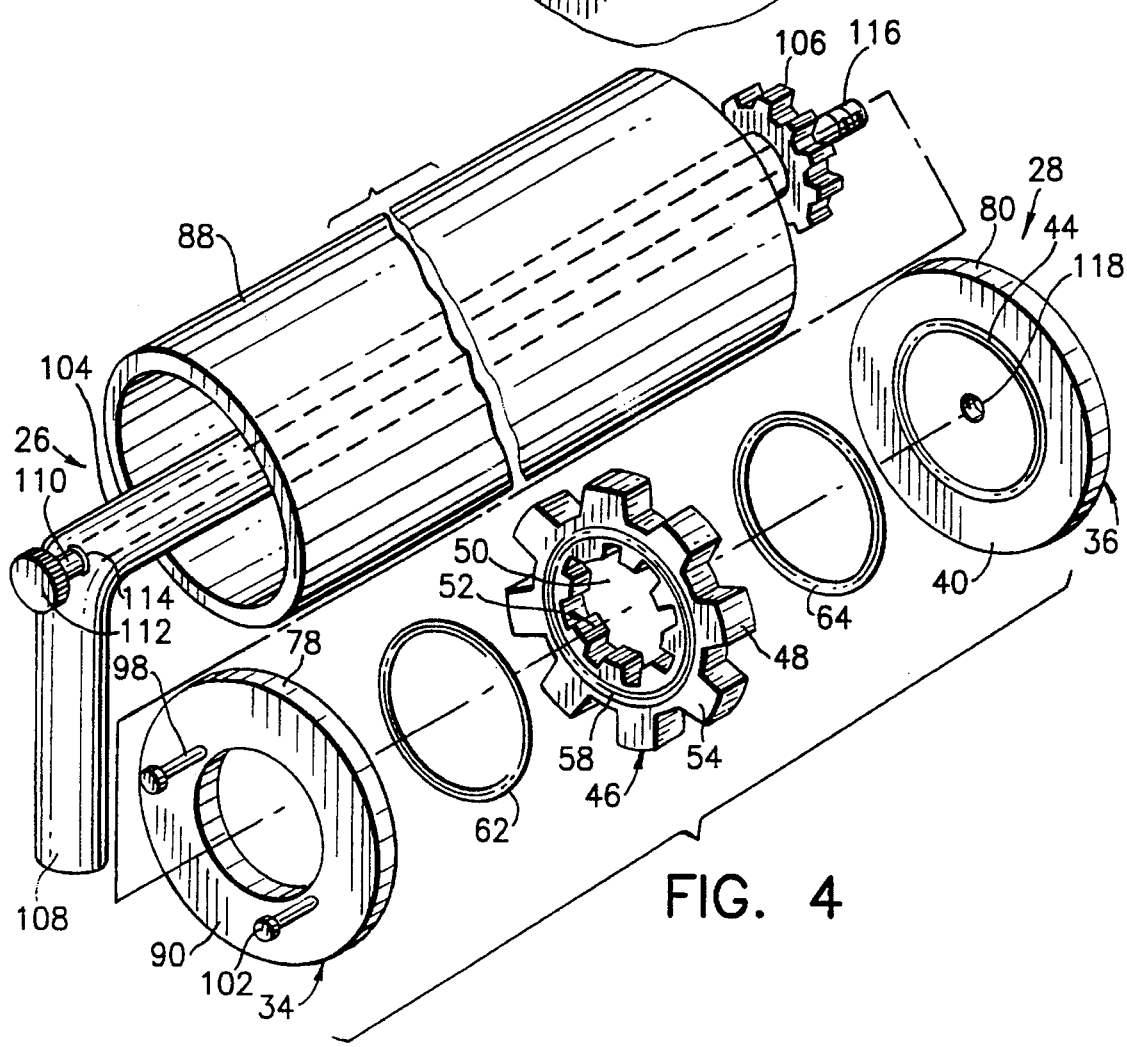
FIG. 4 is a perspective exploded view illustrating many components of the invention.

Turn now to FIGS. 4, 5 and 6 for a more detailed description of the repair assembly 28. As thus seen in FIG. 4, the repair assembly 28 includes a pair of aligned disk members 34, 36 situated in spaced apart parallel planes. The disk members 34, 36 have mutually facing (FIGS. 5 and 5A) planar surfaces 38, 40, respectively, with annular grooves 42, 44 (FIG. 4) also formed in them, respectively. A gear 46 is positioned intermediate the disk members 34, 36 and has an outer circumference defined by a plurality of gear teeth 48 therearound and also has an inner circumference which defines a central void region 50 surrounded by a female splined member 52. As in the instance of the disk members 34, 36, the gear 46 is formed with opposed planar surfaces 54, 56 into which are formed annular grooves 58, 60 congruently sized with the annular grooves 42, 44.

An o-ring seal 62 is positioned intermediate the disk member 34 and the gear 46 and is sized to be matingly, sealingly, receivable in the matching annular grooves 42, 58 when the disk member 34 and gear 46 are proximately positioned.

In a similar fashion, an o-ring seal 64 is positioned intermediate the disk member 36 and the gear 46 and is sized to be matingly, sealingly, receivable in the annular grooves 44, 60 when the disk member 36 and the gear 46 are proximately positioned.

As seen particularly well in FIG. 5, a frangible toroidal shaped flexible container 65 is provided with an innermost compartment 66 for containing liquid filler material and an outermost compartment 68 for containing liquid hardener material which is chemically reactive with the filler material. A frangible wall 70 serves to separate the innermost and outermost compartments 66, 68.

The flexible container 65 may be fabricated of a variety of materials, preferably plastic materials such as polyvinylchloride (PVC), polyethylene (PE), polypropylene (PP), and a variety of acrylics. Specific examples of the two component polymers for use by the invention include: (a) an epoxy and an amine to be cross-linked and cured; (b) polyol and polyisocyanate to yield polyurethane; and (c) polyol and isocyanate, also to yield polyurethane.

As best seen in FIG. 5A, the flexible container 64 has a pair of integral spaced annular folds of material 72, 74 which extend into the central most region of the container 65. One fold 72 is fittingly receivable between the disk member 34 and the o-ring seal 62. The second fold of material is fittingly receivable between the disk member 36 and the o-ring seal 64. The purpose of this construction is to prevent the chemical material from the compartments 66, 68 from issuing into the region of the gear 46 for reasons which will become more apparent subsequently.

A web member 76 is also generally toroidal in shape, being loosely woven or knitted, for example, from yarn of any suitable type. The web member 76 is initially located within the innermost compartment 66 and is suitably attached to each of a plurality of blades 82 as by glue. The web member 76 is expandable between an initial reduced size spaced from the boundary 24 of the damaged region 22 (see FIG. 1) and a final enlarged size, depicted by the second locus 32, at which the outer periphery thereof is generally adjacent to the boundary 24 of the damaged region 22 to be repaired.

Figure 2:
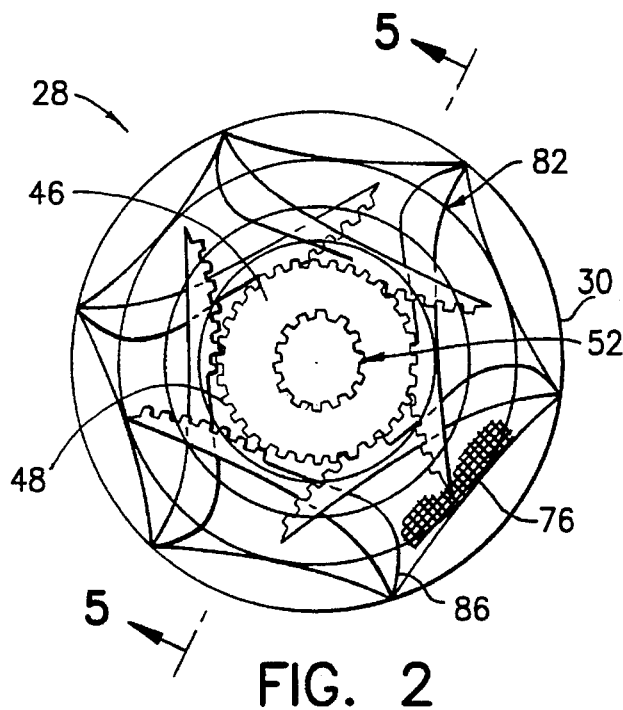
FIGS. 2 and 3 are detail plan views illustrating a repair assembly of the invention in its withdrawn and extended positions, respectively.
Figure 3:
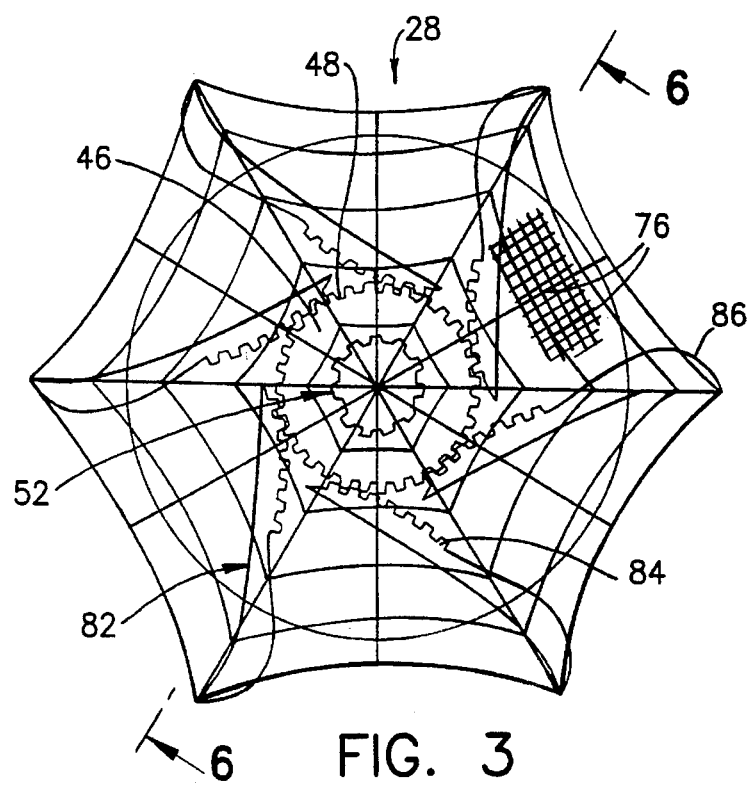

As best seen in FIGS. 2 and 3, the plurality of blades 82 are provided as a part of the repair assembly 28. Each of the blades has a rack 84 in meshing engagement with the gear teeth 48 of the gear 46 and a cutting edge 86 which is ultimately engageable with the web member 76. The rack 84 of each of the blades 82 is held in meshing engagement with the gear teeth 48 of the gear 46 by means of the flexible container 65 which is sized and shaped to bear against the blades when the repair assembly 28 is in its initial reduced size condition as illustrated in FIG. 2. However, this situation continues to exist even to the point at which the repair assembly is in its final enlarged sized condition as depicted in FIGS. 3 and 6.

The plurality of blades 82 are movable from withdrawn positions (FIG. 2) at which the web member 76 assumes its initial reduced size to extended positions (FIG. 3) whereat the web member assumes its final enlarged size. The cutting edges 86 of the blades 82 are engageable, upon movement between the withdrawn and extended positions, first with the frangible wall 70. This causes the frangible wall to fracture and enables the filler material in the innermost compartment 66 to intermix with the hardener material in the outermost compartment 68 and react to form a resultant liquid repair material. With continued movement of the blades 82 between their FIG. 2 and FIG. 3 positions, their cutting edges 86 then engage and fracture the main wall of the flexible container 64 thereby releasing to the exterior of the flexible container the liquid repair material which envelopes the web member and fills the void within the damaged region 22. It will be appreciated that the repair assembly 28 is expendable and becomes integrated with the sheet member 20 when the resultant repair material fully hardens.

The actuating mechanism 26 for moving the repair assembly 28 between its initial reduced size condition (FIG. 2) and its final enlarged size condition (FIG. 3) will now be described.

A cylindrical handle 88 is provided for releasable attachment to an outer surface 90 of the disk member 34.

This may be achieved, for example, by means of a bayonet-type closure construction as illustrated in FIGS. 4, 5, and 6. The cylindrical handle 88 includes an integral base flange 92 with a central aperture 94 and a pair of arcuate mounting holes 96, all as best seen in FIG. 7. A pair of mounting pins 98 are suitably fixed to the disk member 34 and project away from the outer surface 90. They are receivable, respectively, through enlargements 100 of the mounting holes 96. Thereupon, when the cylindrical handle 88 is twisted about its longitudinal axis, heads 102 on the mounting pins 98 prevent withdrawal of the handle from the disk member 34 until the procedure just described is reversed.

An elongated tubular handle 104 is seen to extend through the cylindrical handle 88, including through the central aperture 94. A male splined fitting member 106 is suitably fixed to a distal end of the tubular handle 104 and at its proximal end, the handle 104 is bent to form a gripping portion 108.

An elongated rod 110 extends from a knurled halt 112 at a proximal end, through an aperture 114 in the tubular handle 104 to a threaded distal end 116 which projects from the distal end of the handle 104. Using the knurled halt 112 to rotate the elongated rod 110 about its longitudinal axis, the threaded end 116 becomes threadedly engaged with a threaded bore 118 centrally positioned in the disk member 36. This construction enables an operator to maintain the disk members 34, 36 in a proximal relationship. That is, using one hand to hold the cylindrical handle 88 stationary while rigidly attached to the disk member 34, using the other hand to grip the knurled haft 112 and draw the elongated rod to the left, viewing FIG. 4.

OPERATION

When it is desired to repair a damaged region 22 in a sheet member 20, if the boundary 24 is highly irregular, it may be desirable to use a saw or other suitable cutting tool to shape the opening to as nearly a circular form as possible. Thereupon, apparatus 26 is attached to a suitably sized repair assembly 28. Specifically, the cylindrical handle 88 is fixedly attached to the disk member 34, the tubular handle 104 is inserted through the disk member 34 until the male splined fitting member 106 is coplanar with the gear 46 and enmeshed with the splined member 52 thereon. Then, using the knurled haft 112, the distal end 116 of the elongated rod 110 is threadedly engaged with the threaded bore 118 in the disk member 36.

While the operator holds the cylindrical handle 88 stationary, the knurled haft 112 is drawn to the left (FIGS. 1 and 4) to draw the disk members 34, 36 into a proximal or intimate relationship. At this point, the gripping portion 108 of the tubular handle 104 is rotated in the direction of an arcuate arrow 120 (FIG. 1) to cause the repair assembly 28 to expand from its FIG. 2 condition to its FIG. 3 condition. As this occurs, the cutting edges 86 of the blades 82 first cut through the frangible wall 70 enabling the chemicals in the compartments 66, 68 to intermix, then continue on to cut through the wall of the flexible container 64 and deliver the mixed contents throughout the entire damaged region 22. The web member 76 serves as a support for the resultant liquid repair material until it fully hardens and with operation of the blades 82, drags the liquid repair material out of the container 65 and across the damaged region 22.

The repair assembly 28 remains in the sheet member 20 as a part of the repair structure. After the repair material fully hardens, the cylindrical handle 88 is removed as well as the elongated rod 110 and the tubular handle 104. Thereafter, appropriate, well-known, steps are taken to reconfigure the surface of the sheet member 20 to its original curvature or configuration.

While a preferred embodiment of the invention has been disclosed in detail, it should be understood by those skilled in the art that various other modifications may be made to the illustrated embodiment without departing from the scope of the invention as described in the specification and defined in the appended claims.

We claim:

1. A method of repairing a generally planar sheet member having a damaged region defined by a boundary comprising the steps of:

(a) inserting into the damaged region so as to be coplanar with the sheet member a generally planar repair assembly being smaller than the damaged region and having an outer periphery spaced from the boundary of the sheet member, the repair assembly including frangible flexible container means having a first compartment containing liquid filler material and a second compartment containing liquid hardener chemically reactive with the filler material and frangible wall means separating said first and second compartments, the repair assembly further including web means located within the frangible flexible container means, the web means having an outer periphery being expandable between an initial reduced size spaced from the boundary of the damaged region and a final enlarged size at which the outer periphery thereof is generally adjacent to the boundary of the damaged region to be repaired;

(b) enlarging the web means from its initial reduced size until its outer periphery is generally adjacent to the boundary of the damaged region to be repaired so as to achieve its final enlarged size;

(c) simultaneously with step (b), breaking the frangible wall means in the container means such that the filler material and hardener intermix and react to form a resultant liquid repair material to fill voids between the outer periphery of the repair assembly and the boundary of the damaged region and to fixedly mount the repair assembly to the planar sheet member so as to plug the damaged region, the web means providing a base for supporting the resultant liquid repair material until said liquid repair material hardens and together with the remainder of the repair assembly becomes integrated with the sheet member being repaired; and (d) allowing the filler material and hardener to harden such that the repair assembly becomes integrated with the sheet member.

\* \* \* \* \*